United States Patent
Cao et al.

(10) Patent No.: US 11,232,115 B2
(45) Date of Patent: Jan. 25, 2022

(54) IDENTIFYING FUNCTIONAL ZONES WITHIN A GEOGRAPHIC REGION

(71) Applicant: Nokia Technologies Oy, Espoo (FI)

(72) Inventors: Jin Cao, Berkeley Height, NJ (US); Ran He, Millburn, NJ (US); Yihao Zhang, Chatham, NJ (US); Jingyuan Yang, Summit, NJ (US)

(73) Assignee: Nokia Technologies Oy, Espoo (FI)

( * ) Notice: Subject to any disclaimer, the term of this patent is extended or adjusted under 35 U.S.C. 154(b) by 524 days.

(21) Appl. No.: 15/950,667

(22) Filed: Apr. 11, 2018

(65) Prior Publication Data

US 2019/0318028 A1 Oct. 17, 2019

(51) Int. Cl.
*G06F 16/2458* (2019.01)
*G06N 20/00* (2019.01)
*G06F 16/248* (2019.01)
*G06F 16/29* (2019.01)

(52) U.S. Cl.
CPC ........ *G06F 16/2465* (2019.01); *G06F 16/248* (2019.01); *G06F 16/29* (2019.01); *G06N 20/00* (2019.01)

(58) Field of Classification Search
USPC ...................................................... 707/737
See application file for complete search history.

(56) References Cited

U.S. PATENT DOCUMENTS

| | | | |
|---|---|---|---|
| 8,694,489 B1 | 4/2014 | Yuksel et al. | |
| 8,755,824 B1 | 6/2014 | Wang et al. | |
| 9,123,259 B2 | 9/2015 | Zheng et al. | |
| 9,442,905 B1 | 9/2016 | Kawaguchi | |
| 2007/0298813 A1* | 12/2007 | Singh et al. | H04W 4/029 455/456.1 |
| 2012/0136865 A1 | 5/2012 | Blom et al. | |
| 2012/0244929 A1 | 9/2012 | Oakes et al. | |
| 2013/0181993 A1 | 7/2013 | Herring et al. | |
| 2014/0336926 A1* | 11/2014 | Udeshi | G01C 21/26 701/457 |
| 2015/0187099 A1 | 7/2015 | Huyi et al. | |

(Continued)

FOREIGN PATENT DOCUMENTS

WO 2014158205 A1 10/2014
WO 2018050502 A1 3/2018

OTHER PUBLICATIONS

Hanan Samet et al; Storing a collection of Polygons Using Quadtrees; Jul. 1, 1985.

(Continued)

*Primary Examiner* — Muluemebet Gurmu
(74) *Attorney, Agent, or Firm* — Duft & Bornsen, PC

(57) ABSTRACT

A computer system may use machine learning to determine functional zones within a geographical region. The computer system may determine position data and functional data for locations within a geographical region. The computer system may use machine learning to determine functional zones with a two-stage clustering approach. During the first stage, the computer system may determine geoclusters by clustering locations based on the position data. During the second stage, the computer system may determine functional zones by clustering the geoclusters based on the functional data.

20 Claims, 6 Drawing Sheets

(56) References Cited

U.S. PATENT DOCUMENTS

| | | | |
|---|---|---|---|
| 2015/0243032 A1* | 8/2015 | Ely | G06T 7/194 |
| | | | 382/103 |
| 2016/0225255 A1* | 4/2016 | Thakur et al. | G01C 21/32 |
| 2017/0024415 A1* | 1/2017 | Brucher et al. | G06F 17/30 |

OTHER PUBLICATIONS

Int'l Search Report/Written Opinion; Application PCT/EP2019/057686; dated May 22, 2019.

Guande Qi, Xiaolong Li, Shijian Li, Gang Pan, Zonghui Wang, and Daqing Zhang. Measuring social functions of city regions from large-scale taxi behaviors. In 2011 IEEE International Conference on Pervasive Computing and Communications Workshops (PERCOM Workshops), pp. 384-388, Mar. 2011.

Lijun Sun, Der-Horng Lee, Alex Erath, and Xianfeng Huang. Using smart card data to extract passenger's spatiotemporal density and train's trajectory of mrt system. In Proceedings of the ACM SIGKDD International Workshop on Urban Computing, UrbComp '12, pp. 142-148, New York, NY, USA, 2012. ACM.

Ying Long, Yu Zhang, and Chenyin Cui. Identifying commuting pattern of beijing using bus smart card data. Acta Geographica Sinica, 67(10):1-12, 2012.

Haoying Han, Xiang Yu, and Ying Long. Discovering functional zones using bus smart card data and points of interest in beijing. CoRR, abs/1503.03131, 2015.

Levent Ertoz, Michael Steinbach, and Vipin Kumar. Finding clusters of different sizes, shapes, and densities in noisy, high dimensional data. In Proceedings of the 2003 SIAM International Conference on Data Mining, pp. 47-58. SIAM, 2003.

Martin Ester, Hans-Peter Kriegel, Jbrg Sander, Xiaowei Xu, et al. A density-based algorithm for discovering clusters in large spatial databases with noise. In Kdd, vol. 96, pp. 226-231, 1996.

David Kahle and Hadley Wickham. ggmap: Spatial visualization with ggplot2. The R Journal, 5(1):144-161, 2013.

Arvind Thiagarajan, Lenin Ravindranath, Hari Balakrishnan, Samuel Madden, and Lewis Girod. Accurate, low-energy trajectory mapping for mobile devices. Technical report, MIT CS and AI Lab, Cambridge, MA, 2011.

Robert Tibshirani, Guenther Walther, and Trevor Hastie. Estimating the number of clusters in a data set via the gap statistic. Journal of the Royal Statistical Society: Series B (Statistical Methodology), 63(2):411-423, 2001.

Nicholas Jing Yuan, Yu Zheng, Xing Xie, Yingzi Wang, Kai Zheng, and Hui Xiong. Discovering urban functional zones using latent activity trajectories. IEEE Transactions on Knowledge and Data Engineering, 27(3):712-725, 2015.

Yu Zheng. Trajectory data mining: an overview. ACM Transactions on Intelligent Systems and Technology (TIST), 6(3):29, 2015.

Zhao Weifeng, et al., "Extracting hierarchical landmarks from urban POI data", Journal of Remote Sensing, 15(5):973, 9 2011.

Jin Cao, Sining Chen, Sean Kennedy, Nicolas Kim, and Lisa Zhang. Extracting mobile user behavioral similarity via cell-level location trace. In 20th IEEE Global Internet Symposium (GIS 2017), pages—, Atlanta, Georgia, 2017.

Raymond Austin Jarvis and Edward A. Patrick. Clustering using a similarity measure based on shared near neighbors. IEEE Transactions on computers, 100(11): 1025-1034, 1973.

Guilherme Moreira, Maribel Yasmina Santos, and João Moura-Pires. Snn input parameters: how are they related? In Parallel and Distributed Systems (ICPADS), 2013 International Conference on pp. 492-497. IEEE, 2013.

Excerpt from Hadley Wickham. ggplot2: Elegant Graphics for Data Analysis. Springer-Verlag New York, 2009.

Xiangye Xiao, Yu Zheng, Qiong Luo, and Xing Xie. Inferring social ties between users with human location history. Journal of Ambient Intelligence and Humanized Computing, 5(1):3-19, 2014.

* cited by examiner

IDENTIFYING FUNCTIONAL ZONES WITHIN A GEOGRAPHIC REGION

TECHNICAL FIELD

Various example embodiments relate to machine learning for identifying functional zones within a geographic region.

BACKGROUND

A geographic region may comprise multiple functional zones such as business, residential, entertainment and shopping areas. Identifying functional zones can assist in understanding the spatial structure, land usage, and future development of a geographic region.

BRIEF SUMMARY

This summary is provided to introduce a selection of concepts in a simplified form that are further described below in the Detailed Description. This Summary is not intended to identify key features or essential features of the various embodiments, nor is it intended to be used to limit the scope of the claims.

A computer system may use machine learning to determine functional zones within a geographic region. The computer system may determine position data and functional data for locations within a geographic region. The computer system may determine functional zones using a two-stage clustering approach. During the first stage, the computer system may determine geoclusters by clustering locations based on the position data. During the second stage, the computer system may determine functional zones by clustering the geoclusters based on the functional data.

In some examples, an apparatus may identify a geographic region. The apparatus may determine, for each of multiple locations within the region, position data. The apparatus may determine geoclusters based on the position data; each of the geoclusters may include a subset of the locations. The apparatus may determine, for the locations, functional data. The apparatus may determine, based on the functional data, feature vectors for each of the geoclusters. The apparatus may determine functional zones within the geographic region by clustering, based on the feature vectors, the geoclusters. The apparatus may output the functional zones.

In some examples, determining geoclusters may comprise clustering the geographic locations based on density values computed for each geographic location.

In some examples, the determining geoclusters may comprise determining nearest neighbors for each location, wherein determining nearest neighbors for each location comprises determining a predetermined number of nearest locations; determining a similarity value for each pair of locations, wherein the similarity value indicates a commonality between two locations' nearest neighbors; determining, for each pair of locations, whether the locations of the pair are similar by determining whether the similarity value for the pair satisfies a similarity threshold; determining, for each location, a density value, wherein the density value indicates a number of similar locations; classifying each location based on density value and similarity value; and determining geoclusters based on the classification of each location.

In some examples, the position data may be obtained from one source, and the functional data may be obtained from another source.

In some examples, the apparatus may classify, based on the feature vectors corresponding to the geoclusters within each functional zone, the functional zones, and the classification of each functional zone may indicate a type of activity that locations within the functional zone are used for.

In some examples, classifying the functional zones comprises averaging, for each functional zone, the feature vector of each geocluster that is within each functional zone.

In some examples, the functional data comprises data indicating, for each of at least a portion of the locations, one or more categories of human activity.

In some examples, the functional data may be associated with at least a portion of the locations. The determining of feature vectors may comprise determining topics contained in the reviews using a predetermined topic modeling algorithm, determining, based on the topics, classifications for the at least a portion of the locations, and determining the feature vectors for at least a portion of the geoclusters based on the classifications of the locations within the geocluster.

In some examples, the apparatus may normalize the feature vectors after determining that a one or more differences in magnitude between features of the feature vectors exceed a threshold.

In some examples, an apparatus may comprise means for identifying a geographic region. The apparatus may further comprise means for determining, for each of multiple locations within the geographic region, position data. The apparatus may additionally comprise means for determining geoclusters based on the position data, wherein each of the geoclusters includes a subset of the locations. The apparatus may also comprise means for determining functional data for the locations. The apparatus may also comprise means for determining, based on the functional data, feature vectors for each of the geoclusters. The apparatus may also comprise means for determining, based on the feature vectors, functional zones within the geographical region by clustering the geoclusters. The apparatus may also comprise means for outputting the functional zones.

Additional examples are discussed further below.

BRIEF DESCRIPTION OF THE DRAWINGS

Some example embodiments are shown by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which various embodiments are shown by way of example. It is to be understood that other embodiments may be utilized and structural and functional modifications may be made without departing from the scope of the present disclosure.

Figure 1:
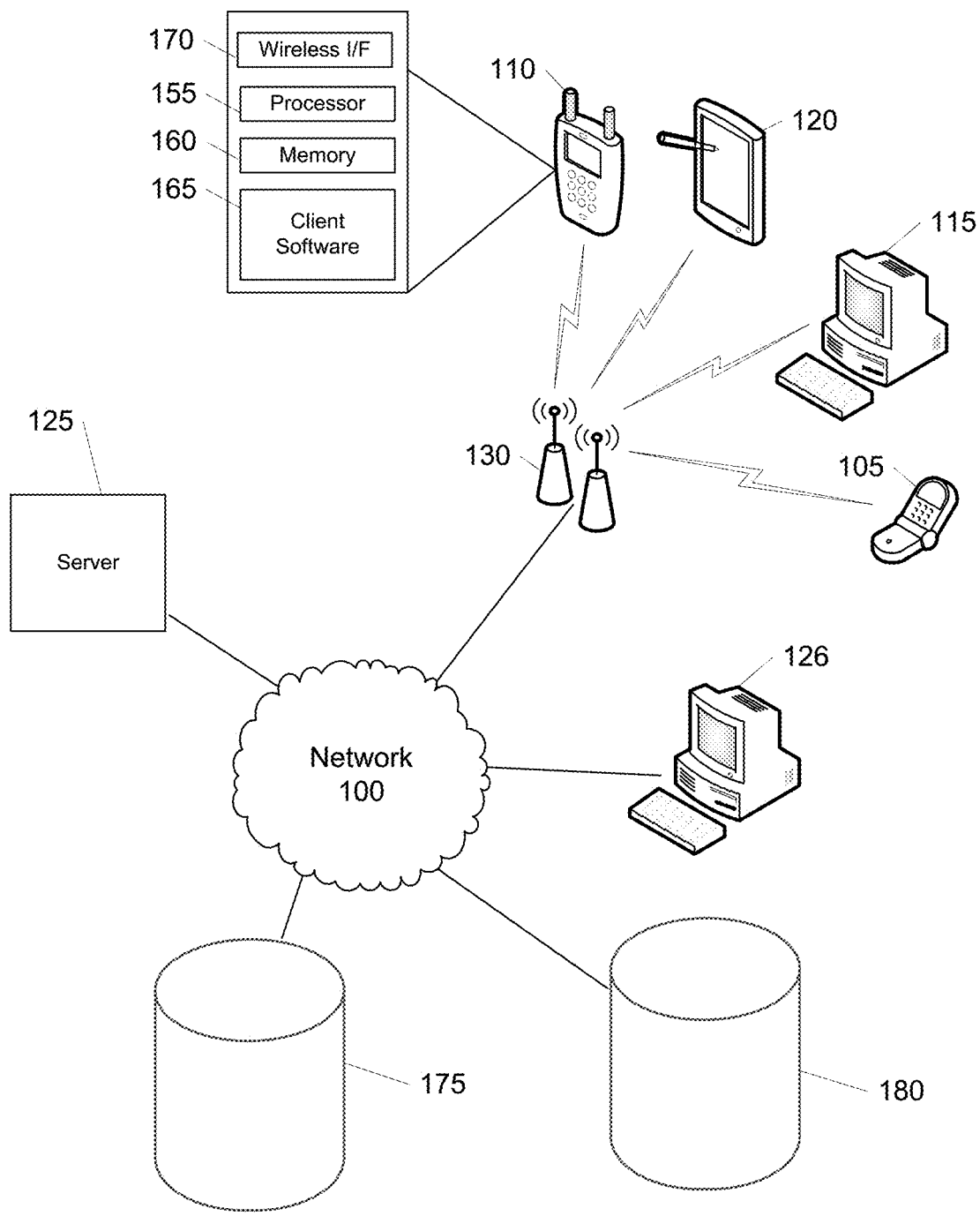
FIG. 1 is a block diagram of an example computer system in which one or more embodiments may be implemented.

FIG. 1 is a block diagram of an example computer system in which one or more embodiments may be implemented. As seen in FIG. 1, the system may include an access node (e.g., access point (AP)) 130 and a number of wireless stations (STAs) 105, 110, 115, and 120. The STAs may be computing devices. The system may also include additional computing devices such as, e.g., a server 125, a workstation 126, and databases 175 and 180.

The STAs may include, for example, a mobile communication device 105, mobile phone 110, personal digital assistant (PDA) or mobile computer 120, computer work station (for example, personal computer (PC)) 115, or other portable or stationary device having a wireless interface capable of communicating with an access node (e.g., access point) 130. The STAs in the system may communicate with a network 100 or with one another through the AP 130. Network 100 may include wired and wireless connections and network elements, and connections over the networks may include permanent or temporary connections. Communication through the AP 130 is not limited to the illustrated devices and may include additional mobile or fixed devices. Additional devices, such as server 125, workstation 126, and databases 175 and 180 may communicate over wired connections.

While one AP 130 is shown in FIG. 1, the STAs may communicate with multiple APs 130 connected to the same network 100 or multiple networks 100. Also, while shown as a single network in FIG. 1 for simplicity, network 100 may include multiple networks that are interlinked so as to provide internetworked communications. Such networks may include one or more private or public packet-switched networks, for example the Internet, one or more private or public circuit-switched networks, for example a public switched telephone network, a satellite network, one or more wireless local area networks (e.g., 802.11 networks), one or more metropolitan area networks (e.g., 802.16 networks), and/or one or more cellular networks configured to facilitate communications to and from the STAs through one or more APs 130. In various embodiments, an STA may perform the functions of an AP for other STAs.

Communication between the AP and the STAs may include uplink transmissions (e.g., transmissions from an STA to the AP) and downlink transmissions (e.g., transmissions from the AP to one or more of the STAs). Uplink and downlink transmissions may utilize the same protocols or may utilize different protocols. For example, in various embodiments STAs 105, 110, 115, and 120 may include software 165 that is configured to coordinate the transmission and reception of information to and from other devices through AP 130 and/or network 100. In one arrangement, client software 165 may include specific protocols for requesting and receiving content through the wireless network. Client software 165 may be stored in computer-readable memory 160 such as read only, random access memory, writeable and rewriteable media and removable media and may include instructions that cause one or more components—for example, processor 155, wireless interface (I/F) 170, and/or a display—of the STAs to perform various functions and methods including those described herein. AP 130 may include similar software 165, memory 160, processor 155 and wireless interface 170 as the STAs.

Any of the method steps, operations, procedures or functions described herein may be implemented using one or more processors and/or one or more memory in combination with machine executable instructions that cause the processors and other components to perform the method steps, procedures or functions. For example, as further described below, one or more computer devices (such as one or more of the computer devices shown in FIG. 1) may each include one or more processors and/or one or more memory storing executable instructions that cause the computer device(s) to perform operations as described herein. An example computing device is further described below in connection with FIG. 6.

A number of discrete locations may be identified within a geographic region. Each location may be described with position data and/or other data that provides context on where the location is. Each location may also be described based on functional data, as explained below.

Figure 2:
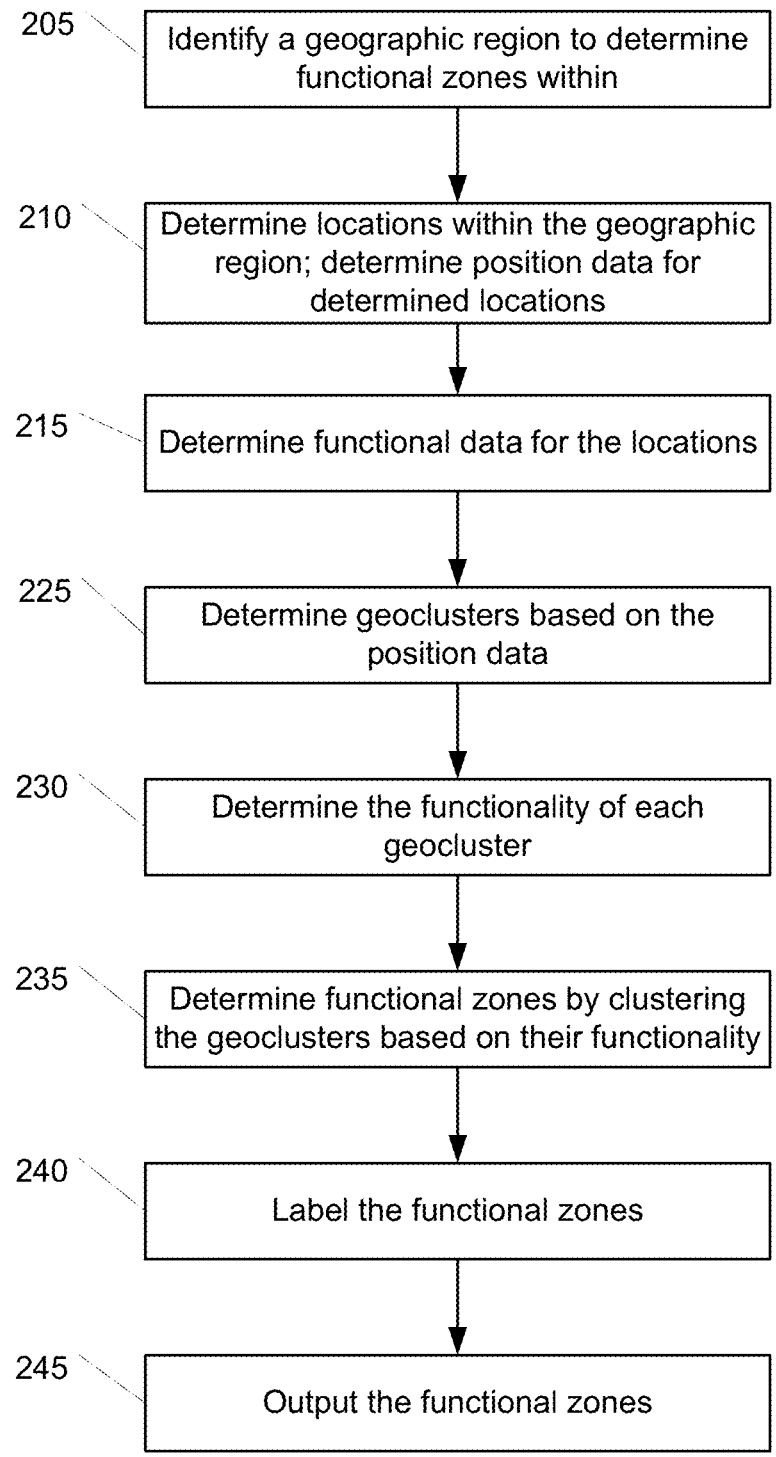
FIG. 2 is a flow chart showing an example method of determining functional zones within a geographic region through machine learning.

FIG. 2 is a flow chart showing an example method of determining functional zones within a geographic region through machine learning. In one or more embodiments, one or more steps shown in FIG. 2 may be performed by one or more computing devices, entities, or systems. For example, some or all of the steps shown in FIG. 2 may be performed by one or more computing devices, such as, but not limited to, computing devices of the type shown in FIG. 1. The steps shown in FIG. 2 may be embodied in computer-executable instructions that are stored in a computer-readable medium, such as a non-transitory computer readable medium. The steps shown in FIG. 2 need not all be performed in the order specified, and some steps may be omitted or changed in order.

In step 205, a computing device may identify a geographic region to determine functional zones within. The geographic region may be anywhere in the world and may be any size (e.g., the geographic region may contain a country, a continent, a city, a neighborhood, or any other size region). The geographic region may be determined based on data input from a user or from a device that indicates a geographic region to be analyzed.

In step 210, the computing device may determine locations within the geographic region identified in step 205, and may further determine position data for those determined locations. Locations may be determined in any of various ways. For example, in urban areas every address within the geographic region may be treated as a separate location. As another example, a region may be divided into contiguous blocks or parcels of a predetermined size, with each block (or parcel) then being treated as a separate location. This method may be useful in connection with rural areas in which addresses may be very sparse.

Position data may be determined for each location. The computing device may receive the position data from a separate system or it may determine the position data itself. The computing device may determine the position data using address data and Global Positioning System data. The position data may include latitude and longitude data. For example, for an address within a region, the computing device may determine position data by determining the latitude and longitude values for the center of the area corresponding to the address. The position data may come from a source such as Microsoft Maps, MapQuest, OpenStreetMap, Google Maps, Apple Map, etc. The position data may indicate a land parcel, building, or city block that contains the location. The position data may also include address data or zip code data.

In step 215, the computing device may determine functional data for the locations (determined in step 210) within the geographic region identified in step 205. Functional data may indicate how a location is used or how it may be used.

Functional data may also or alternatively describe the purpose of a location. Functional data may indicate what activities humans engage in at a location. Functional data may include descriptions of a person's experience at a location. Functional data may include a category descriptor for a location. A category descriptor may indicate a purpose or type of activity performed at a location. For example, a hospital's functional data may indicate that the hospital is labeled as a "healthcare" location. Functional data for a bank may label the bank as a "financial" location. Other examples of categories may include automotive, businesses and services, community and government, landmark, retail, social, sports and recreation, residential, transportation, and travel. Categories may also include subcategories. For example, a location such as "Café Paris" may be categorized as a "social" location. Within the social category, Café Paris may be subcategorized as "food and dining." Within the food and dining category, Café Paris may be further subcategorized as "restaurants." Within the restaurants category, Café Paris may be further subcategorized as "French."

Functional data may indicate land conditions and/or land use for a location. In a region that contains agricultural locations, functional data may indicate what crops are grown in each location, what types of animals are raised, etc. Functional data may indicate land type such as desert, wetlands, forest, mountains, etc.

Functional data may include other information that indicates the function of a location. For example, functional data may include textual descriptions of the location. Textual descriptions may be found in reviews of a location that have been written by people that have visited the location. Functional data may also include numerical values used to rate a location in a review (e.g., 4 out of 5 stars). Functional data may also include information contained in news articles that mention or describe the location.

The position data and the functional data may come from the same source or from different sources. For example, the position data may come from database 175 and the functional data may come from database 180. Functional data may be obtained from pre-existing sources, e.g., records of businesses associated with addresses in a geographic region. Functional data may be derived by analysis of data from other sources. For example, functional data may be derived from online reviews of businesses or other activities associated with a location. As another example, and when relevant functions include land use and/or land type, the computing device may use satellite images or other aerial images to identify landmarks and other locations such as deserts, wetlands, forests, or mountains. The computing device may, for example, use machine learning for image classification to determine characteristics of locations (e.g., contiguous blocks or parcels) within a rural area.

In step 225, the computing device may determine geoclusters based on the position data determined in step 210. A geocluster may comprise data that represents or indicates a number of locations that are grouped together based on the positions and/or other factors associated with the grouped locations. The geographic region identified in 205 may contain multiple geoclusters. Geoclusters may overlap with each other. The computing device may use any clustering algorithm to determine the geoclusters. For example, the computing device may use a density based clustering algorithm such as density-based spatial clustering of applications with noise (DBSCAN) or Shared Nearest Neighbors (SNN) to determine the geoclusters. An example of using a density based clustering algorithm for operations of step 225 is further described in FIG. 3. The computing device may store geocluster data determined in step 225.

In step 230, the computing device may determine the functionality of each geocluster. The computing device may use a category descriptor (from the functional data determined in step 215) of each location within a geocluster to determine the functionality of the geocluster. The computing system may, for example, determine a feature vector that represents the geocluster's functionality. The computing device may determine, for each geocluster, an M-dimensional feature vector $F=(f_1, f_2, \ldots f_M)$, where M is the number of categories used to describe locations in the geographic region identified in step 205. Each component $f_m$, where m may be any value in $1, \ldots M$, may have a value representing a fraction of the locations within the geocluster that are described with category m. As an example, locations within a region may be described with four categories of functional data: financial, recreation, entertainment, and government. There may be a geocluster with 10 locations in this example region. Four (4) of the locations may be categorized as financial, zero (0) locations may be categorized as recreation, two (2) of the locations may be categorized as government, and four (4) of the locations may be categorized as entertainment. In this example, a feature vector would contain 4 dimensions (each of the categories representing one dimension), and M=4. Assuming a convention in which, for this example, $F=(f_{financial}, f_{recreation}, f_{entertainment}, f_{government})$, the example geocluster may be represented with the following feature vector: (0.4, 0, 0.2, 0.4). If a location is designated with multiple categories (e.g., a primary category and a subcategory) then the location may be counted for one category (e.g., only the primary category or only a subcategory) when computing the feature vector. Alternatively a location may be counted for each of its designated categories when calculating the feature vector (i.e. the location may be counted in multiple corresponding dimensions of the feature vector).

Feature vectors that represent a geocluster's functionality may also be determined in other ways. The computing device may use a topic model (e.g., Latent Dirichlet Allocation (LDA), Anchor Words, etc.) to determine topics contained within a location's reviews. The computing device may then determine a feature vector where each component is the fraction of locations within the geocluster that contain the topic.

In some topic models, documents are made up of a distribution of topics and topics are made up of a distribution of words. Reviews for a location may be combined and treated as one document. A topic modeling algorithm may be used to process such documents for locations to determine the topics of each location in the region. If documents are a distribution of topics, then the topic model may show the composition of each document in terms of topics. For example if there are 4 topics, a document may be distributed as 20% from topic 1, 30% from topic 2, 45% from topic 3 and 5% from topic 4.

After the topics have been determined, a feature vector may be generated for each geocluster based on the topics of the locations contained within the geocluster. For example, the computing device may create an N-dimensional feature vector $F=(f_1, f_2, f_n)$ where N is the number of topics determined in the topic model. Each component $f_n$ may be based on the proportion of topic n contained in each of the locations within the geocluster that are described with category n. For example, $f_1$ may be the sum of every location's (within a geocluster) topic 1 proportion. $f_2$ may be the sum of every location's (within a geocluster) topic 2 proportion and so on.

The computing device may also create a vector representation for the textual descriptions that correspond to locations within a geocluster. This may involve combining some or all of the reviews for each location within a geocluster into one document. Using the combined reviews, the computing device may create a vector representation of the reviews for each geocluster. For example, the computing device may use term frequency inverse document frequency (TF-IDF) to generate a vector representation of the reviews for locations within a geocluster. Using TF-IDF, the computing device may generate a TF-IDF vector for each geocluster. The TF-IDF vectors may be used as feature vectors in generating data indicative of functional zones as described below in step 235.

The feature vector may be a vector representation of all or a portion of words in the reviews determined by a deep neural network. The computing device may also use neural network techniques to embed words into vector representations (e.g., Word2vec, Doc2Vec, Siamese CBOW, Skip-Thought Vectors, etc.). For example, the computing device may embed a portion of the reviews for locations within a geocluster into a vector. This vector may then be used as a representation of the functionality of the geocluster.

A feature vector may also include a numerical rating from a review as one of its elements. For example, an element in a feature vector may represent the average number of stars awarded by user reviews to locations within a geocluster.

In step 235, the computing device may determine data indicative of functional zones by clustering the geoclusters based on the functionality of the locations contained within each geocluster. The computing device may cluster feature vectors generated in step 230 using any clustering algorithm (e.g., K-means, affinity propagation, mean-shift, spectral clustering, Ward hierarchical clustering, agglomerative clustering, density-based spatial clustering of applications with noise (DBSCAN), Gaussian mixtures, Birch, etc.) to determine functional zones.

For example, using K-means clustering, K may be a parameter that represents how many functional zones (or clusters of geoclusters) will be created. To avoid confusion with the clustering discussed in connection with step 225, a cluster of geoclusters is referred to herein as a "gc-cluster". The K-means algorithm may begin with a gc-cluster initialization step. In the gc-cluster initialization step, K randomly decided feature vectors (each feature vector representing a geocluster) may be selected as gc-cluster centers. Each gc-cluster center may represent a different gc-cluster.

The K-means algorithm may then perform a gc-cluster assignment step in which each feature vector is assigned to a gc-cluster. In the gc-cluster assignment step, distances or similarity values between each feature vector and each gc-cluster center may be determined using a distance or similarity metric (e.g., Euclidean distance, Manhattan distance, cosine distance, Minkowski distance, Jaccard similarity). Each feature vector (and thus, its corresponding geocluster) may be assigned to its closest or most similar gc-cluster center.

After every feature vector is assigned to a gc-cluster, the K-means algorithm may perform a center assignment step. In the center assignment step, the K-means algorithm may determine new centers for each gc-cluster (e.g., by determining the geometric mean of the feature vectors that belong to the gc-cluster).

The K-means algorithm may repeat the gc-cluster assignment and center assignment steps until convergence. Convergence may occur if the centers of each gc-cluster remain the same after one or more repetitions of the center assignment step. Alternatively, the K-means algorithm may end after a predetermined number of repetitions (e.g., 5, 9, 17, etc.) of the gc-cluster assignment and center assignment steps have been completed. The K-means algorithm may be performed by the computing device.

In step 240, the computing device may label the functional zones (gc-clusters) determined in step 235. The computing device may label a functional zone by averaging the feature vectors of each geocluster that belongs to the functional zone. The computer device may then label the functional zone with some number of features that satisfy a threshold within the feature vector. For example, the two features with the highest values may be used as the label for a functional zone.

In step 245, the computing device may output the functional zones. The computing device may display the functional zones in a user interface. The computing device may draw a convex hull or other shape around locations in each geocluster to indicate to a user which locations belong to which geocluster. The computing device may provide a visual indication of what functional zone each geocluster belongs to. Functional zones may be indicated by using different shading, hashing, or other marking overlaid on top of a shape that covers the locations within a geocluster. The visual indication of a functional zone may also include coloring geoclusters that belong to the same functional zone with the same color.

A user interface to display the functional zones may include buttons to allow a user to select a region for the computing device to compute functional zones. The user interface may also include a button to recompute the functional zones within a region. The user interface may also include a feature that allows a user to manually modify (redraw or redefine) the functional zones and geoclusters. The user interface may also allow a user to recompute functional zones while maintaining any manual modification that the user created within the functional zones or geoclusters. The user interface may also allow a user to delete geoclusters or functional zones and recluster the geoclusters/functional zones.

Figure 3:
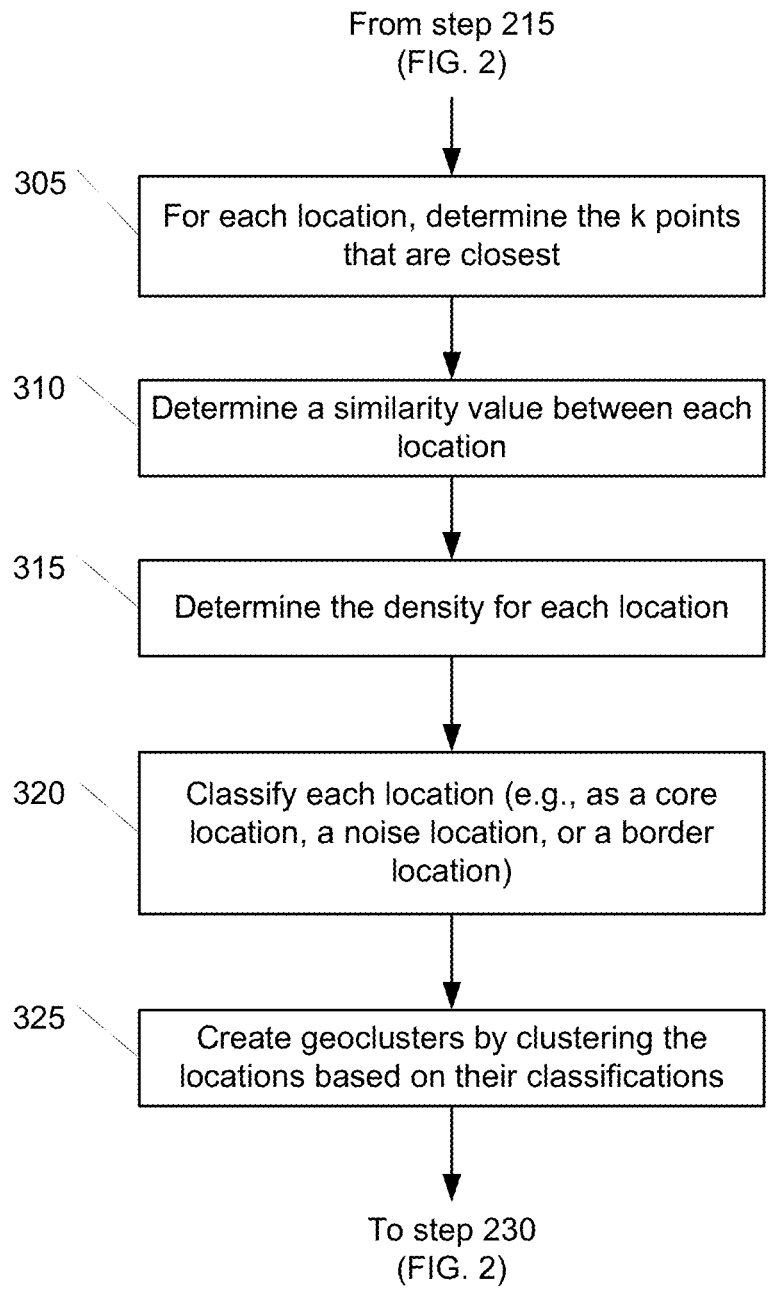
FIG. 3 is a flow chart showing an example method of generating geoclusters using density-based clustering.

FIG. 3 is a flow chart showing an example method of determining geoclusters using density-based clustering, as mentioned above in connection with step 225 of FIG. 2. One or more steps shown in FIG. 3 may be performed by the one or more computing devices performing operations shown in FIG. 2. The steps shown in FIG. 3 may be embodied in computer-executable instructions that are stored in a computer-readable medium, such as a non-transitory computer readable medium. The steps shown in FIG. 3 need not all be performed in the order specified, and some steps may be omitted or changed in order.

In step 303, the computing device may continue from step 215 in FIG. 2. In step 305, the computing device may determine each location's k nearest locations. For convenience, the k nearest locations may be called the nearest neighbors. In particular, for each of the locations determined in step 210, the computing device may determine which of the k remaining locations determined in step 210 are nearest. The value of k may be an integer (and different from "K" discussed in connection with step 235) selected based on the number of locations in the region. For example, k may be approximately 0.25% of the number of locations in the region. The value k may influence the number of functional zones that are generated by the computing device. Decreasing k may allow the computing device to generate more functional zones while increasing k may lead to the computing device generating fewer functional zones. The computing device may use the position data determined in step 210 to determine distances between locations. For example the computing device may use the longitude and latitude of a point in the middle of each location to compute distances between the locations. The computing device may use a variety of distance metrics to determine the distance between any two locations including Euclidean or straight line distance, road distance, Manhattan distance, etc. The symbol N $N_k$ ( ) may be defined as the k nearest neighbors of a location identified by an argument between the parentheses In step 310, the computing device may determine a similarity value between each pair of locations within the geographical region. The similarity value may measure the commonality between the nearest neighbors of two locations. Similarity between two locations u and v may be defined as: $sim(u, v)=|N\ N_k(u) \cap N\ N_k(v)|$. In other words, the similarity between two locations u and v may be defined as the number of locations that are nearest neighbors to both u and v.

The computing device may deem location v as similar to location u if the similarity value exceeds some threshold $\varepsilon$: $sim(u, V) \geq \varepsilon$. The threshold $\varepsilon$ may be specified by a user.

In step 315, the computing device may determine a density for each location. The density of a location v may be a value that indicates the number of locations that are both 1) a nearest neighbor of v; and 2) similar to v.

In step 320, the computing device may classify each location using similarity and density. Locations may be classified as core locations or non-core locations. A location with density higher than a threshold $\gamma$ may be deemed a core location. The threshold $\gamma$ may be determined by a user. Non-core locations may be further classified as noise locations or border locations. A noise location may be defined as a location that is not similar to any core location (using the definition of similarity above). A noise location may be a location that is far from other locations. A border location may be any location that is not a core location and not a noise location.

The threshold $\gamma$ may be set to a value between 0.92*k and 0.96*k, where k is the number of nearest neighbors. The threshold $\varepsilon$ may be set to 0.185*$\gamma$. Values for $\varepsilon$, $\gamma$, and other parameters may be modified to adjust performance.

In step 325, the computing device may create geoclusters by clustering the locations based on their classifications as core locations, noise locations, or border locations. The computing device may assign core locations that are similar to each other (as defined above) to the same cluster. The computing device may assign a border location to the same cluster that its most similar core location belongs to. The computing device may assign each noise location to a cluster by itself or may ignore the noise locations during the geocluster generation process. The computing device may also cluster the noise locations with the geocluster that contains the noise location's nearest core location or border location. In some examples, the computing device may cluster the noise location with a geocluster if the distance between the noise location and the core or border location satisfies a threshold (e.g., the distance between the noise location and nearest core location is less than 500 meters).

Figure 4:
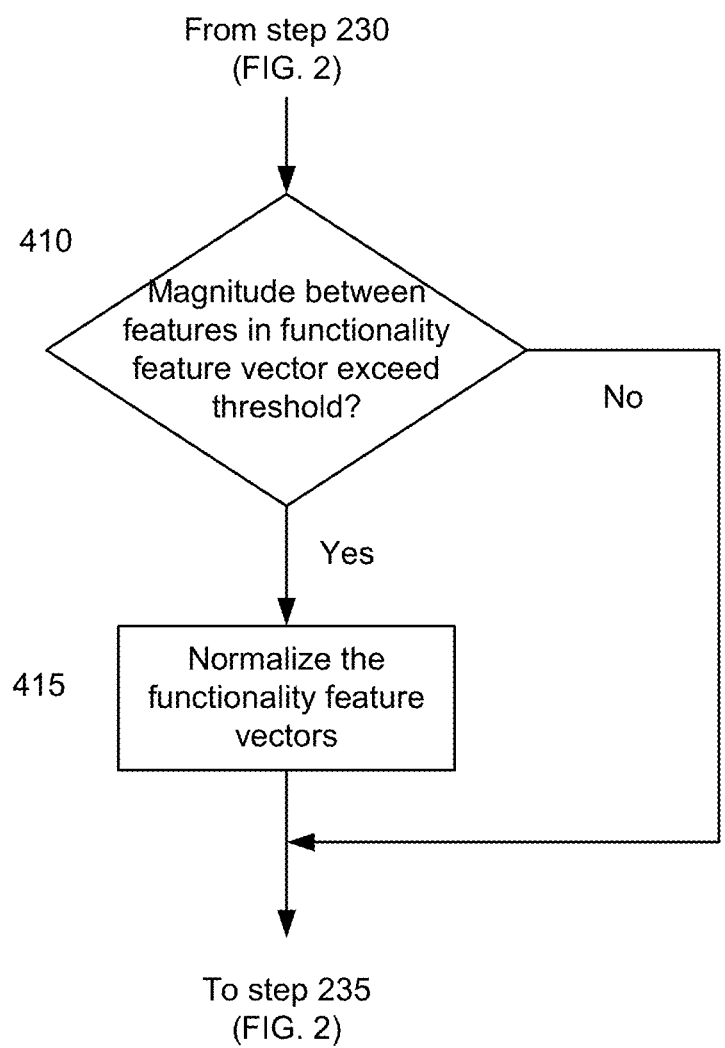
FIG. 4 is a flow chart showing an example method of modifying a feature vector to improve the determination of functional zones within a region.

FIG. 4 is a flow chart showing an example method of modifying a feature vector that represents the functionality of a geocluster. Feature vectors may be modified to, e.g., improve the determination of functional zones within a region. One or more steps shown in FIG. 4 may be performed by the one or more computing devices performing the operations shown in FIGS. 2 and 3. The steps shown in FIG. 4 may be embodied in computer-executable instructions that are stored in a computer-readable medium, such as a non-transitory computer readable medium. The steps shown in FIG. 4 need not all be performed in the order specified, and some steps may be omitted or changed in order.

The operations shown in FIG. 4 may be performed after operations of step 230 (FIG. 2) and before the operations of step 235. In step 410, the computing device may determine whether the magnitude between features in the functionality feature vectors for the geoclusters exceeds a threshold. The threshold may be that one feature is 10 times more common or 100 times more common than another feature. For example, if a region contains 100,000 locations categorized as healthcare locations and only 2,000 locations categorized as landmark locations then the computing device may determine that the magnitude between the healthcare feature and the landmark feature exceeds a threshold. If the magnitude between two or more features exceeds the threshold then the computing device may normalize the feature vectors in step 415. The computing device may normalize the feature vectors by linearly rescaling the features so that the minimum feature (e.g., the least common category for locations within the region) is mapped to 0 and the maximum feature (e.g., the most common category among the locations in the region) is mapped to 1. After normalizing the feature vectors, the computing device may proceed to step 235 (FIG. 2). If in step 410 the magnitude between features is determined not to exceed a threshold, then the computing device may proceed to step 235 without performing step 415.

Figure 5:
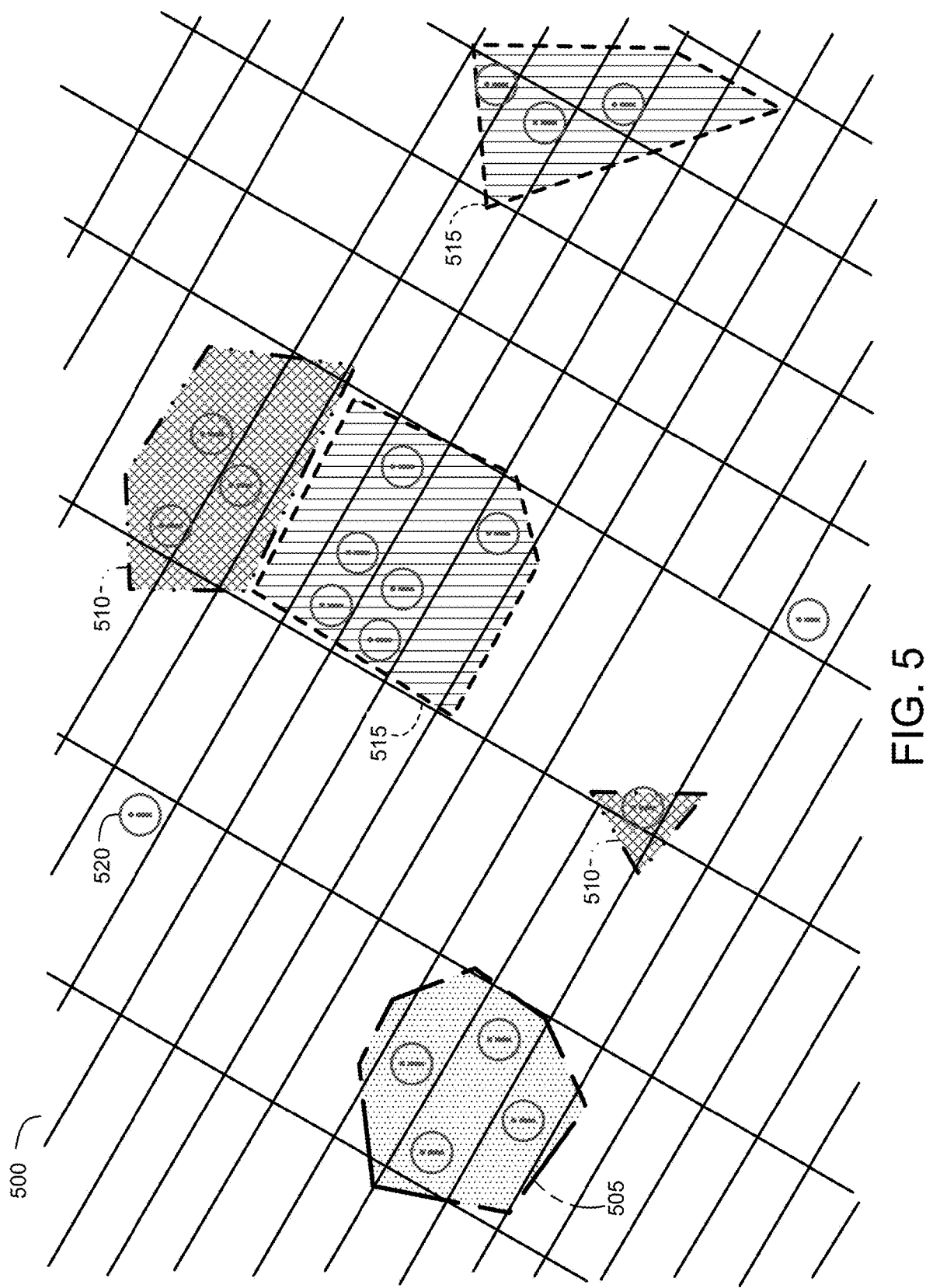
FIG. 5 shows an example output of functional zones.

FIG. 5 illustrates an exemplary output of functional zones as described in step 245 of FIG. 2. The region 500 depicted in FIG. 5 is an example region that includes a portion of a city with many intersecting streets. Within the region are several locations marked with icons (e.g., location 520). According to one exemplary output, the region contains three functional zones 505, 510, and 515. Functional zone 505 contains one geocluster that includes a sports arena, a bowling alley, a theater, and an arcade. Functional zone 505 may be labelled by the computing device as an entertainment zone. Functional zone 510 contains two geoclusters that contain parks. Functional zone 510 may be labelled by the computing device as a recreational zone. Functional zone 515 contains two geoclusters that contain restaurants and clothing stores. Functional zone 515 may be labelled by the computing device as a shopping and dining zone. Location 520 may be a noise location and therefore may not have been included in any geocluster or functional zone.

Figure 6:
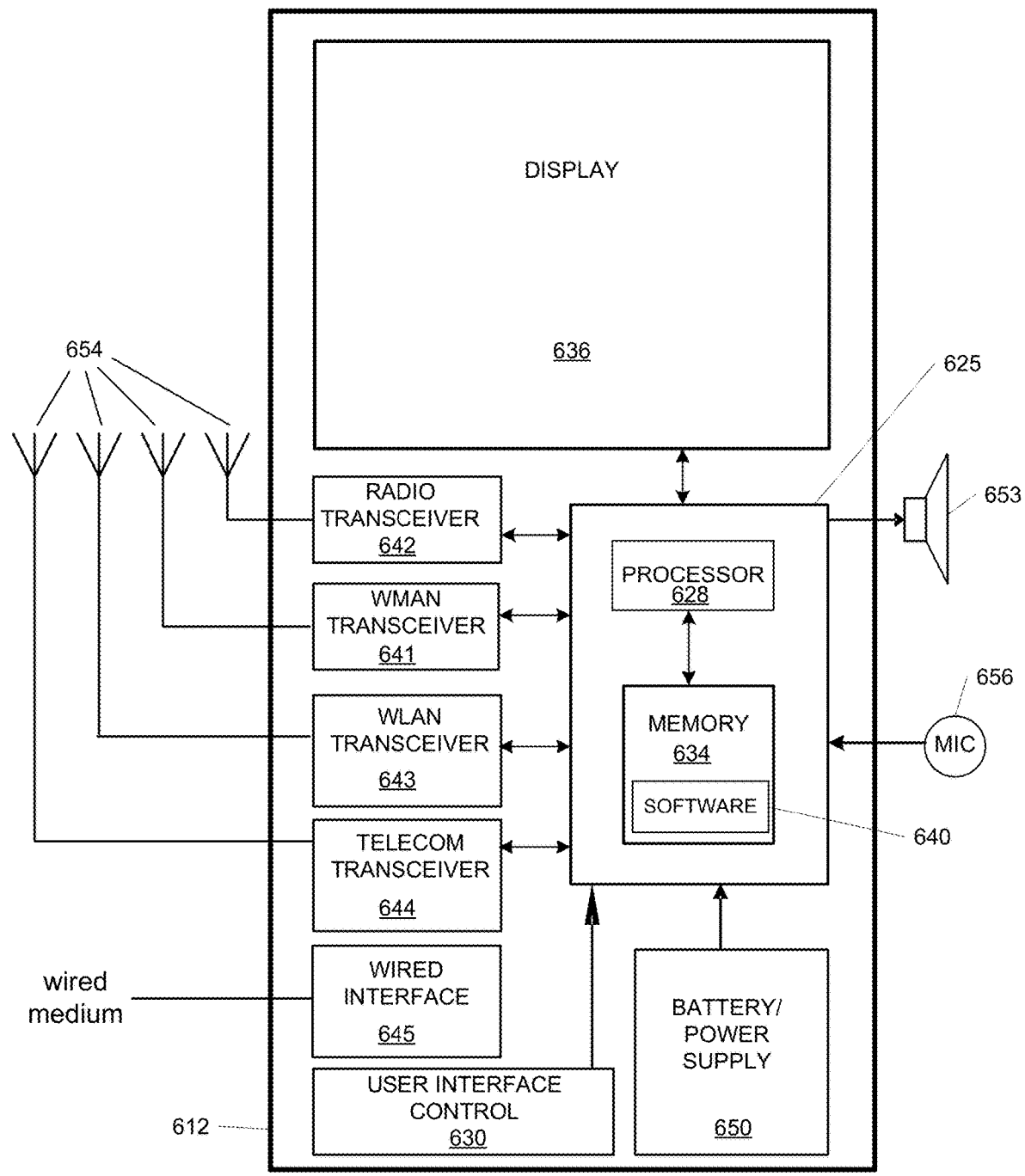
FIG. 6 is a block diagram of an example computing device

FIG. 6 illustrates an example apparatus, in particular a computing device 612, that may be used in a communication network such as the one shown in FIG. 1, to implement any or all of stations 105, 110, 115, 120, and/or AP 130, and/or server 125, and/or workstation 126, and/or databases 175 and 180, and/or other computing devices to perform the steps described above and in FIGS. 2-5. Computing device 612 may include a controller 625. The controller 625 may be connected to a user interface control 630, display 636 and/or other elements as shown. Controller 625 may include circuitry, such as for example one or more processors 628 and one or more memory 634 storing software 640. The software 640 may comprise, for example, one or more of the following software options: client software 165, user interface software, server software, etc.

Device 612 may also include a battery 650 or other power supply device, speaker 653, and one or more antennae 654. Device 612 may include user interface circuitry, such as user interface control 630. User interface control 630 may include controllers or adapters, and other circuitry, configured to receive input from or provide output to a keypad, touch screen, voice interface—for example via microphone 656, function keys, joystick, data glove, mouse and the like. The user interface circuitry and user interface software may be configured to facilitate user control of at least some functions of device 612 though use of a display 636. Display 636 may be configured to display at least a portion of a user interface of device 612. Additionally, the display may be configured to facilitate user control of at least some functions of the device (for example, display 636 could be a touch screen).

Software 640 may be stored within memory 634 to provide instructions to processor 628 such that when the instructions are executed, processor 628, device 612 and/or other components of device 612 are caused to perform various functions or methods such as those described herein. The software may comprise machine executable instructions and data used by processor 628 and other components of computing device 612 and may be stored in a storage facility such as memory 634 and/or in hardware logic in an integrated circuit, ASIC, etc. Software may include both applications and operating system software, and may include code segments, instructions, applets, pre-compiled code, compiled code, computer programs, program modules, engines, program logic, and combinations thereof.

Memory 634 may include any of various types of tangible machine-readable storage medium, including one or more of the following types of storage devices: read only memory (ROM) modules, random access memory (RAM) modules, magnetic tape, magnetic discs (for example, a fixed hard disk drive or a removable floppy disk), optical disk (for example, a CD-ROM disc, a CD-RW disc, a DVD disc), flash memory, and EEPROM memory. As used herein (including the claims), a tangible or non-transitory machine-readable storage medium is a physical structure that may be touched by a human. A signal would not by itself constitute a tangible or non-transitory machine-readable storage medium, although other embodiments may include signals or ephemeral versions of instructions executable by one or more processors to carry out one or more of the operations described herein.

As used herein, processor 628 (and any other processor or computer described herein) may include any of various types of processors whether used alone or in combination with executable instructions stored in a memory or other computer-readable storage medium. Processors should be understood to encompass any of various types of computing structures including, but not limited to, one or more microprocessors, special-purpose computer chips, field-programmable gate arrays (FPGAs), controllers, application-specific integrated circuits (ASICs), combinations of hardware/firmware/software, or other special or general-purpose processing circuitry.

As used in this application, the term "circuitry" may refer to any of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone, server, or other computing device, to perform various functions) and (c) circuits, such as a microprocessor(s) or a portion of a microprocessor(s), that require software or firmware for operation, even if the software or firmware is not physically present.

These examples of "circuitry" apply to all uses of this term in this application, including in any claims. As an example, as used in this application, the term "circuitry" would also cover an implementation of merely a processor (or multiple processors) or portion of a processor and its (or their) accompanying software and/or firmware. The term "circuitry" would also cover, for example, a baseband integrated circuit or applications processor integrated circuit for a mobile phone or a similar integrated circuit in a server, a cellular network device, or other network device.

Device 612 or its various components may be mobile and be configured to receive, decode and process various types of transmissions including transmissions in Wi-Fi networks according to a wireless local area network (e.g., the IEEE 802.11 WLAN standards 802.11n, 802.11ac, etc.) and/or wireless metro area network (WMAN) standards (e.g., 802.16), through a specific one or more WLAN transceivers 643, one or more WMAN transceivers 641. Additionally or alternatively, device 612 may be configured to receive, decode and process transmissions through various other transceivers, such as FM/AM Radio transceiver 642, and telecommunications transceiver 644 (e.g., cellular network receiver such as CDMA, GSM, 4G LTE, 5G, etc.). A wired interface 645 (e.g., an Ethernet interface) may be configured to provide communication via a wired communication medium.

Although the above description of FIG. 6 generally relates to a mobile device, other devices or systems may include the same or similar components and perform the same or similar functions and methods. For example, a computer communicating over a wired network connection (for example, server 125, workstation 126, databases 175 and 180 of FIG. 1) may include the components or a subset of the components described above, and may be configured to perform the same or similar functions as device 612 and its components.

Examples described herein offer technical advantages. For example, determining functional zones may rely on position data of geographic locations and functional data of geographic locations. Determining functional zones does not necessarily require human trajectory data. Human trajectory data may include data that indicates the location of a person or the path a person travels. Due to power and privacy constraints, it can be difficult to obtain accurate human trajectory data. For example, mobile phone GPS data may be unreliable because many users may disable GPS tracking or only use GPS tracking intermittently. Additionally, using two stages of clustering (determining geoclusters, and determining functional zones based on the geoclusters and functional data) allows flexibility. Parameters may be fine tuned for each clustering stage separately.

Although specific examples have been described, those skilled in the art will appreciate that there are numerous variations and permutations of the above-described systems and methods that are contained within the spirit and scope of the disclosure. Any and all permutations, combinations, and subcombinations of features described herein, including but not limited to features specifically recited in claims, are within the scope of the disclosure

We claim:
1. An apparatus comprising
    at least one processor; and
    at least one memory including computer program code;

the at least one memory and the computer program code configured to, with the at least one processor, cause the apparatus at least to perform:

identifying a geographic region;

determining locations within the geographic region;

determining position data for the locations by accessing at least one database over a network;

determining functional data for the locations by accessing the at least one database over the network, wherein the functional data is obtained from preexisting records in the at least one database indicating at least a type of activity performed at each of the locations; and using machine learning to determine functional zones within the geographic region with a two-stage clustering approach by:

determining, for a first stage, geoclusters of the locations based on the position data for the locations, wherein each of the geoclusters includes a number of the locations grouped together based on the position data;

clustering, for a second stage, the geoclusters into the functional zones based on the functionality of the locations within each of the geoclusters; and outputting the functional zones by displaying the functional zones on a user interface;

wherein determining the geoclusters comprises:

determining a corresponding set of nearest neighbors for each of the locations, wherein, for each of the locations, the corresponding set of nearest neighbors comprises a predetermined number of the other locations nearest to the location; and determining a similarity value for each pair of the locations, wherein, for each of the pairs, the similarity value indicates a commonality between the sets of nearest neighbors corresponding to the locations of the pair.

2. The apparatus of claim 1, wherein the computer program code is configured to, with the at least one processor, cause the apparatus to perform the determining the geoclusters by clustering the locations based on density values computed for the locations.

3. The apparatus of claim 1, wherein determining the geoclusters further comprises:

determining, for each of the pairs, whether the locations of the pair are similar by determining whether the similarity value for the pair satisfies a similarity threshold;

determining, for each location, a density value, wherein the density value indicates a number of the other locations determined to be similar to the location;

determining, for each of the locations, a classification based on the density value and the similarity value of the location; and determining the geoclusters based on the classifications of the locations.

4. The apparatus of claim 1, wherein the computer program code is configured to, with the at least one processor, cause the apparatus to obtain the position data and the functional data from separate sources.

5. The apparatus of claim 1, wherein the computer program code is configured to, with the at least one processor, cause the apparatus to perform:

determining features vectors for the geoclusters based on categories obtained from the at least one database that are used to describe the locations within each of the geoclusters; and labeling the functional zones based on the features vectors of the geoclusters in each of the functional zones.

6. The apparatus of claim 5, wherein the computer program code is configured to, with the at least one processor, cause the apparatus to perform:

labeling the functional zones by averaging the feature vectors of the geoclusters in each of the functional zones.

7. The apparatus of claim 5, wherein the functional data comprises data indicating, for each of at least a portion of the locations, one or more categories of human activity.

8. The apparatus of claim 5, wherein the functional data comprises reviews associated with at least a portion of the locations, and wherein the computer program code is configured to, with the at least one processor, cause the apparatus to perform the determining the feature vectors by:

determining, using a topic modeling algorithm, topics contained in the reviews;

determining, based on the topics, the categories for the at least a portion of the locations; and determining the feature vectors for at least a portion of the geoclusters based on the categories of the locations within the geocluster.

9. The apparatus of claim 5, wherein the computer program code is configured to, with the at least one processor, cause the apparatus to perform:

normalizing the feature vectors after determining that one or more differences in magnitude between features of the feature vectors exceed a threshold.

10. A method comprising:

identifying, by one or more computing devices, a geographic region;

determining, by the one or more computing devices, locations within the geographic region;

determining, by the one or more computing devices, position data for the locations by accessing at least one database over a network;

determining, by the one or more computing devices, functional data for the locations by accessing the at least one database over the network, wherein the functional data is obtained from preexisting records in the at least one database indicating at least a type of activity performed at each of the locations; and using machine learning to determine functional zones within the geographic region with a two-stage clustering approach by:

determining, by the one or more computing devices for a first stage, geoclusters of the locations based on the position data for the locations, wherein each of the geoclusters includes a number of the locations grouped together based on the position data;

clustering, by the one or more computing devices for a second stage, the geoclusters into the functional zones based on the functionality of the locations within each of the geoclusters; and outputting, by the one or more computing devices, the functional zones by displaying the functional zones on a user interface;

wherein determining the geoclusters comprises:

determining a corresponding set of nearest neighbors for each of the locations, wherein, for each of the locations, the corresponding set of nearest neighbors comprises a predetermined number of the other locations nearest to the location; and determining a similarity value for each pair of the locations, wherein, for each of the pairs, the similarity value indicates a commonality between the sets of nearest neighbors corresponding to the locations of the pair.

11. The method of claim 10, wherein determining the geoclusters comprises clustering the locations based on density values computed for the locations.

12. The method of claim 10, wherein determining the geoclusters further comprises:
    determining, for each of the pairs, whether the locations of the pair are similar by determining whether the similarity value for the pair satisfies a similarity threshold;
    determining, for each location, a density value, wherein the density value indicates a number of the other locations determined to be similar to the location;
    determining, for each of the locations, a classification based on the density value and the similarity value of the location; and
    determining the geoclusters based on the classifications of the locations.

13. The method of claim 10, further comprising obtaining the position data and the functional data from separate sources.

14. The method of claim 10, further comprising:
    determining features vectors for the geoclusters based on categories obtained from the at least one database that are used to describe the locations within each of the geoclusters; and
    labeling the functional zones based on the features vectors of the geoclusters in each of the functional zones.

15. The method of claim 14, wherein labeling the functional zones comprises averaging the feature vectors of the geoclusters in each of the functional zones.

16. The method of claim 14, wherein the functional data comprises data indicating, for each of at least a portion of the locations, one or more categories of human activity.

17. The method of claim 14, wherein the functional data comprises reviews associated with at least a portion of the locations, and wherein determining the feature vectors comprises:
    determining, using a topic modeling algorithm, topics contained in the reviews;
    determining, based on the topics, the categories for the at least a portion of the locations; and
    determining the feature vectors for at least a portion of the geoclusters based on the categories of the locations within the geocluster.

18. The method of claim 14, further comprising:
    normalizing the feature vectors after determining that one or more differences in magnitude between features of the feature vectors exceed a threshold.

19. A non-transitory computer-readable medium comprising program instructions for causing an apparatus to perform at least the following:
    identifying a geographic region;
    determining locations within the geographic region;
    determining position data for the locations by accessing at least one database over a network;
    determining functional data for the locations by accessing the at least one database over the network, wherein the functional data is obtained from preexisting records in the at least one database indicating at least a type of activity performed at each of the locations; and
    using machine learning to determine functional zones within the geographic region with a two-stage clustering approach by:
        determining, for a first stage, geoclusters of the locations based on the position data for the locations, wherein each of the geoclusters includes a number of the locations grouped together based on the position data;
        clustering, for a second stage, the geoclusters into the functional zones based on the functionality of the locations within each of the geoclusters; and
        outputting the functional zones by displaying the functional zones on a user interface;
    wherein determining the geoclusters comprises:
        determining a corresponding set of nearest neighbors for each of the locations, wherein, for each of the locations, the corresponding set of nearest neighbors comprises a predetermined number of the other locations nearest to the location; and
        determining a similarity value for each pair of the locations, wherein, for each of the pairs, the similarity value indicates a commonality between the sets of nearest neighbors corresponding to the locations of the pair.

20. The non-transitory computer-readable medium of claim 19, wherein the instructions, when executed, cause the apparatus to perform the determining the geoclusters by clustering the locations based on density values computed for the locations.

* * * * *